June 8, 1965  P. L. GOTZY  3,188,370
METHOD OF INCAPSULATING AN OBJECT
Filed Nov. 14, 1960  2 Sheets-Sheet 1
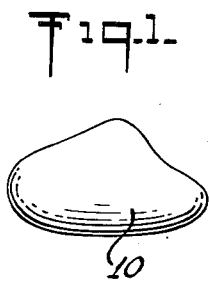
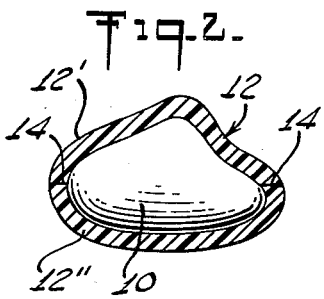
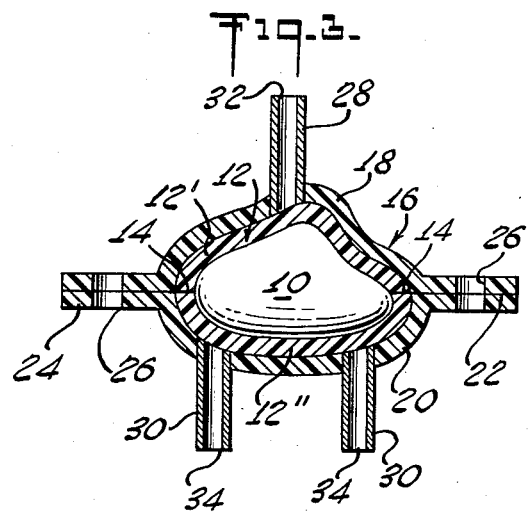
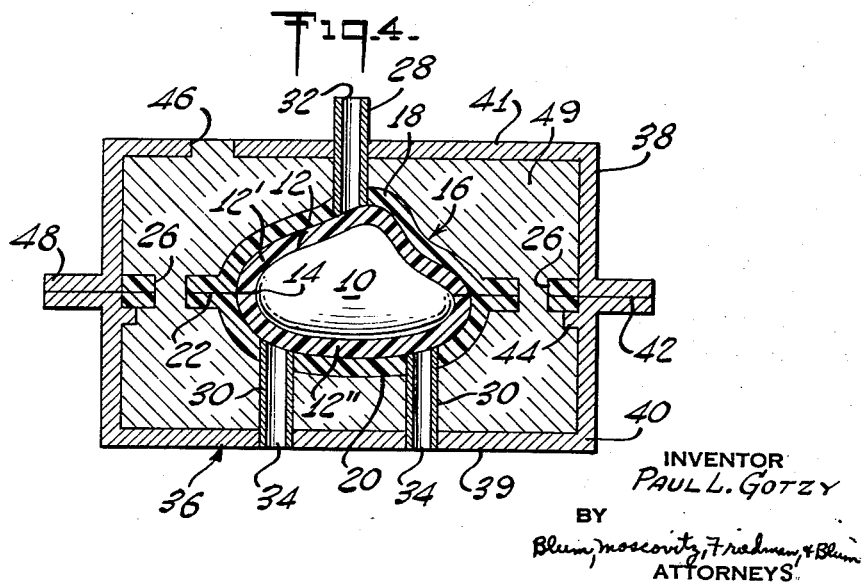
INVENTOR
PAUL L. GOTZY
BY
ATTORNEYS

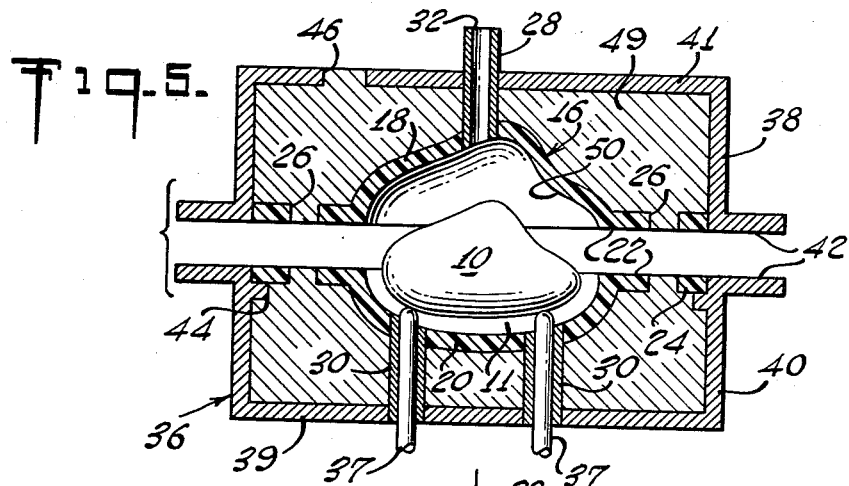
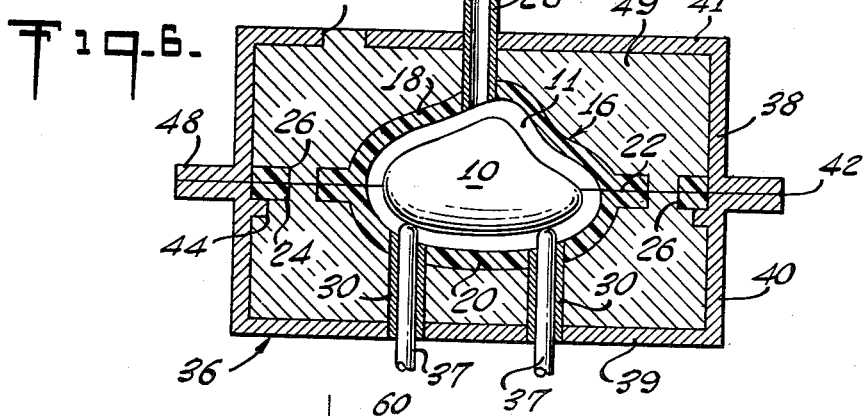
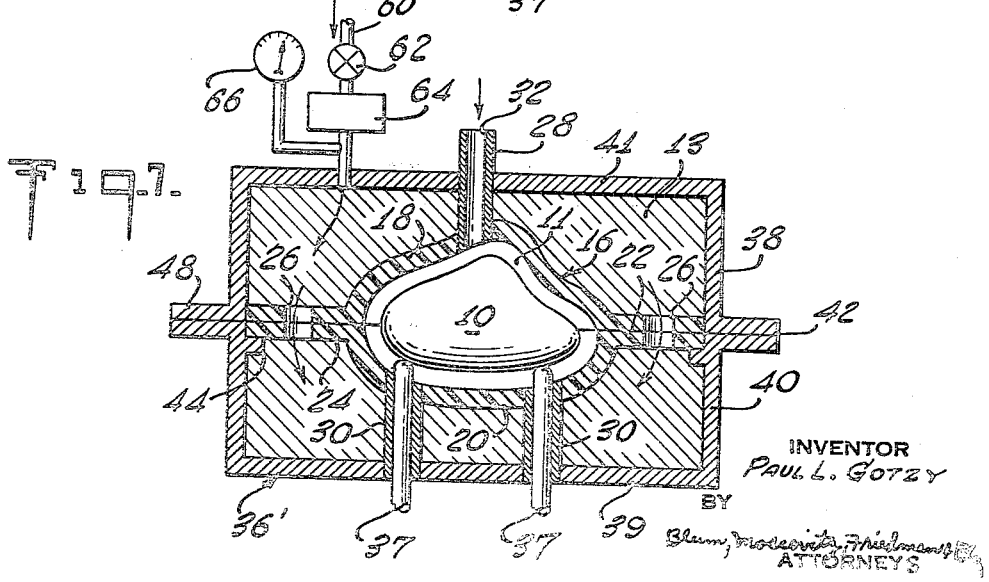

United States Patent Office 3,188,370
Patented June 8, 1965

3,188,370
METHOD OF INCAPSULATING AN OBJECT
Paul L. Gotzy, Lansdale, Pa., assignor to
Andrew A. Halacsy
Filed Nov. 14, 1960, Ser. No. 68,822
10 Claims. (Cl. 264—226)

This invention relates generally to the art of molding and, more particularly, to a novel and improved method for fully incapsulating an object in a plastic coating.

One important aim and object of the present invention is the provision of an improved method for incapsulating an object in which the uniformity and thickness of the coating may be accurately predetermined and controlled. Pursuant to this object of the present invention the incapsulating mold is formed from the object itself which is initially provided with a pair of superposed incapsulating layers, the inner one of which is used to form the mold and subsequently defines a space for the incapsulant with the outer one becoming a part of the mold and defining a cavity for the incapsulant.

Other objects, features and advantages of the present invention will become apparent as the description thereof proceeds when considered in connection with the accompanying illustrative drawings in which:

FIG. 1 is an elevational view of an exemplified object to be incapsulated pursuant to the present invention;

FIG. 2 is a view similar to FIG. 1 showing a first incapsulating layer on the object;

FIG. 3 is a view similar to FIG. 2 showing a second incapsulating layer superposed on the first layer;

FIG. 4 is a cross sectional view of a mold formed in accordance with the present invention from the incapsulated object shown in FIG. 3;

FIG. 5 is a view similar to FIG. 4 showing the mold parts in disassembled or spaced apart relation with the first incapsulating layer stripped from the object;

FIG. 6 is a view similar to FIG. 5 showing the mold in closed condition preparatory to the operation of molding an incapsulating layer on the object; and FIG. 7 is a view similar to FIG. 6 showing another embodiment of the present invention.

In general, the mold of the present invention is formed from the object itself to be incapsulated which is initially provided with a pair of similar incapsulating layers, the inner one of which is used to form the mold and when stripped therefrom defines a space for the incapsulant, with the outer one becoming a structural component of the mold and defining a cavity for the incapsulant.

Referring to the drawings, and more particularly FIGS. 1 through 6 thereof, there is shown an object 10 of any desired construction and configuration which is to be incapsulated pursuant to the invention herein. The exemplified object 10 to be incapsulated is initially coated with a suitable release agent and is thereafter incapsulated in a first coating 12 having upper and lower parts 12' and 12" separating at parting line 14. The incapsulating layer 12 is dimensionally the same as the incapsulating layer to be subsequently applied to the object 10 in the molding operation to be described. The incapsulating layer 12 may be formed on the object 10 in any desired manner pursuant to any of the well known techniques, for example, sheets of a suitable incapsulating material may be vacuum or pressure formed on the object and may comprise multiple layers of textile, glass-textile, or the like, saturated with a plastic material such as varnish, epoxy resin, polyester, silicone resin, or the like which may be hardened by hardening the saturant by any of the well known methods such as by the use of heat or mixing with a curing agent or catalyst correlated with the selected material. Thus the method of forming the layer 12 is well known and forms no part of the present invention. As will be apparent from the description which follows, the parts 12' and 12" of the layer 12 may be separated along the parting line 14 in order to permit the release of the object 10 from the layer 12. It will be understood that the material of layer 12 is selected so as to withstand the conditions occurring during the build up of the mold to be described.

The external surface of the layer 12 is coated with a suitable release agent and a second incapsulating layer 16 is formed over the layer 12. This layer 16 is formed in a similar manner as layer 12 and consists of upper and lower parts 18 and 20, respectively which are separable along the parting line 22. The layer 16 includes a peripherally extending projecting flange 24 having apertures 26 extending therethrough for a purpose which will be apparent from the description which follows. Extending through the wall of the part 18 to the layer 12 is a fitting 28, and similarly a pair of fittings 30 extend through the wall of the part 20 to the part 12" of layer 12. The fitting 28 defines a passage 32 for the reception of molding material in the molding or incapsulating operation to be described. The fittings 30 defining passageways 34 for the axially movable support pins 37 shown in FIG. 6. The assembly shown in FIG. 3 having the dual incapsulating layers superposed thereon is adapted for build-up into the mold 36 shown in FIG. 4.

The mold 36 comprises a receptacle formed of two mating halves or parts 38 and 40 which are assembled to each other along the parting line 42. The mold part 40 is provided with a projecting flange or shelf 44 for the support of the flange 24 of the incapsulated assembly shown in FIG. 3. The fittings 30 are suitably integrated with, and extending through, the lower wall 39 of the mold part 40 and the fitting 28 extends through and projects beyond the upper wall 41 of the mold part 38. The basic support for the incapsulated assembly in the mold is provided by the shelf 44. The mold 36 includes an opening or inlet fitting 46 in wall 41 for filling the entire mold around the incapsulated assembly. The mold parts of the mold 36 may be releasably clamped together in mold-defining relation in any suitable manner, for example, by the use of clamps at the projecting flange 48. Any filling medium 49 may be used to back up the molding pressure such as lead, concrete, metal or plastic having the requisite mechanical properties. The selected material 49 is admitted through port 46 to fill the entire space within the mold around layer 16. Suitable separators in the plane of parting line 22 will be positioned in openings 26 so as to permit the mold parts to be separated as shown in FIG. 5. It will be understood that the filler material 49 selected will be one with the requisite structural characteristics to back up the compression pressures applied thereto during the molding operation to be described.

After the formation of the mold 36, the mold parts 38 and 40 are separated along the parting line 42 as shown in FIG. 5 and the inner incapsulating layer 12 is stripped from the object 10. The incapsulating layer 16 becomes a structural component of the mold 36 and defines the cavity 50 thereof. The stripped layer 12 thus defines a space 11 for the incapsulant to be finally formed on the object 10. The now stripped object 10 is supported in the cavity 50, defined between the closed mold parts as shown in FIG. 6, by the axially movable support pins 37 which ride in the fittings 30. As shown in FIG. 6, the space 11 defined between the object and cavity 50 corresponds to the layer 12 which has been used to form the mold and is subsequently stripped from the object as described above. The mold, as shown in FIG. 6, is now conditioned for the molding operation in which the incapsulating material is admitted through fitting 28 into the cavity 50 to surround the object and thereby incapsulate the same. The incapsulant admitted through fitting 28 will be in accordance with any well known molding or casting technique and if desired, multiple admission ports may be provided and suitable vents or other openings, as dictated by the particular molding or casting process, will be provided as will be apparent to those skilled in the art. After the molding or casting operation is completed in which an incapsulating layer is formed on the object and the incapsulant has hardened in the cavity, the admitting pressure of the incapsulant is shut off and the mold is opened along the parting line 42 for the removal of the incapsulated object which now corresponds to that shown in FIG. 2 without a line of parting. The supporting pins 37 may be retracted from the cavity 50 prior to the setting or hardening of the incapsulant so as to fully incapsulate the object. It will be understood that any suitable material may be used for forming the incapsulating layer on the object to be incapsulated. Should the molding or casting process require a cooling or heating medium in the mold, the latter will be provided with suitable heating or cooling means of any well known type and arrangement.

With reference to FIG. 7, there is shown a modified embodiment 36' of the present invention in which the backing pressure for the molding operation is constituted by fluid pressure as distinguished from the solid backing 49 of the previous embodiment 36. The interior space 13 of mold 36' is subjected to a fluid backing pressure which will be but slightly higher than the molding or casting pressure of the incapsulating operation. The mold 36' includes an inlet conduit 60 for the fluid pressure and a control shutoff valve 62 and a pressure regulating valve 64 interposed in the conduit 60, there being a suitable pressure gauge 66 tapped into the conduit 60 beyond the pressure regulator 64. In this manner the fluid pressure admitted into the mold space 13 is controlled and measured. The requisite backing pressure is admitted into the space 13 only during the molding operation and only sufficient pressure is applied to the space 13 to back up the pressure of the casting or molding operation. Thus the layer 16 is subjected to backing pressure only during the molding or incapsulating operation and such pressure is only slightly in excess of the molding or casting pressure utilized to form the final incapsulating layer on the object 10. The fluid pressure applied through conduit 60 for the backing operation fills the space 13 and the openings 26 provide a passageway to the lower half of the mold. Thus the embodiment of FIG. 7 corresponds to the previous embodiment in all respects except that fluid pressure is utilized to fill the space 13 and back up the molding or casting pressure admitted through the fitting 28 during the incapsulating operation. It will be understood that the fluid pressure source may be any suitable liquid or gaseous medium and pursuant to this technique, the pressure exerted on the layer 16 is minimal since the pressure exerted thereon is merely the differential pressure between the casting or molding pressure and the fluid backing pressure applied through the line 60.

From the above it will be apparent that the object 10 is incapsulated as shown in FIG. 2 except for the absence of a parting line with a layer in which the uniformity and thickness of its coating may be accurately predetermined in accordance with the initial coating 12 applied thereon and that the mold and technique herein is inherently simple and economical.

While specific embodiments of the invention have been shown and described in detail to illustrate the application of the principles of the invention, it will be understood that the invention may be embodied otherwise without departing from such principles.

What is claimed is:

1. A method of incapsulating an object in a coating, comprising the steps of providing said object with a plurality of superposed incapsulating layers, forming a separable mold from said object with the outer incapsulating layer forming part of the mold and defining a cavity thereof, opening said mold and stripping the inner incapsulating layer from said object, closing said mold with said object positioned in the cavity thereof so as to define a space between said object and cavity corresponding to said stripped layer, and thereafter filling said space with an incapsulant so as to incapsulate said object therein.

2. A method of incapsulating an object in a plastic coating, comprising the steps of forming a plurality of incapsulating layers on the object with the inner layer being dimensioned corresponding to the resultant plastic coating desired, forming an openable mold from said incapsulated object with the outer incapsulating layer becoming a structural part of the mold and defining the cavity thereof, opening said mold for the removal of said object together with its inner incapsulating layer, stripping the latter from said object and repositioning said object in the mold so as to define an incapsulating space in the cavity corresponding to said stripped layer, and thereafter filling said space with an incapsulant so as to incapsulate said object therein.

3. A method of incapsulating an object in a plastic coating, comprising the steps of forming a plurality of incapsulating layers on the object with the inner layer being dimensioned corresponding to the resultant plastic coating desired, forming an openable mold from said incapsulated object with the outer incapsulating layer becoming a structural part of the mold and defining the cavity thereof, said mold being formed with a backing of solid material for said outer layer, opening said mold for the removal of said object together with its inner incapsulating layer, stripping the latter from said object and repositioning said object in the mold so as to define an incapsulating space in the cavity corresponding to said stripped layer, and thereafter filling said space with an incapsulant so as to incapsulate said object therein.

4. A method of incapsulating an object in a plastic coating, comprising the steps of forming a plurality of incapsulating layers on the object with the inner layer being dimensioned corresponding to the resultant plastic coating desired, forming an openable mold from said incapsulated object with the outer incapsulating layer becoming a structural part of the mold and defining the cavity thereof, said mold being formed with a hollow backing adapted for the application of fluid pressure thereto during the incapsulating operation, opening said mold for the removal of said object together with its inner incapsulating layer, stripping the latter from said object and repositioning said object in the mold so as to define an incapsulating space in the cavity corresponding to said stripped layer, and thereafter filling said space with an incapsulant so as to incapsulate said object therein.

5. A method of incapsulating an object in a plastic coating, comprising the steps of forming a plurality of incapsulating layers on the object with the inner layer being dimensioned corresponding to the resultant plastic coating desired, forming an openable mold from said incapsulated object with the outer incapsulating layer becoming a structural part of the mold and defining the cavity thereof, opening said mold for the removal of said object together with its inner incapsulating layer, stripping the latter from said object, repositioning said object in the mold and supporting the same therein so as to define an incapsulating space in the cavity corresponding to said stripped layer, pressure filling said space with an incapsulant so as to incapsulate said object therein, and opening said mold so as to remove said incapsulated object therefrom.

6. A method of incapsulating an object in an incapsulant, comprising the steps of forming a plurality of incapsulating layers on the object with a parting agent disposed over the object and between the layers, forming a separable mold from said object with the outer incapsulating layer forming part of the mold and defining a cavity thereof, opening said mold and stripping the inner incapsulating layer from said object, closing said mold with said object positioned in the cavity thereof so as to define a space between said object and cavity corresponding to said stripped layer, and thereafter filling said space with an incapsulant so as to incapsulate said object therein.

7. A method of incapsulating an object in a plastic coating, comprising the steps of forming a plurality of incapsulating layers on the object with the inner layer being dimensioned corresponding to the resultant plastic coating desired, forming an openable mold from said incapsulated object with the outer incapsulating layer becoming a structural part of the mold and defining the cavity thereof, said mold being formed with a hollow backing adapted for the application of fluid pressure thereto during the incapsulating operation, opening said mold for the removal of said object together with its inner incapsulating layer, stripping the latter from said object and repositioning said object in the mold so as to define an incapsulating space in the cavity corresponding to said stripped layer, pressure filling said space with an incapsulant simultaneously with the application of fluid pressure to said hollow backing, and thereafter opening said mold so as to remove said incapsulated object therefrom.

8. A method of incapsulating an object in a plastic coating, comprising the steps of forming a plurality of incapsulating layers on the object with the inner layer being dimensioned corresponding to the resultant plastic coating desired, forming an openable mold from said incapsulated object with the outer incapsulating layer becoming a structural part of the mold and defining the cavity thereof, said mold being formed with a hollow backing adapted for the application of fluid pressure thereto during the incapsulating operation, opening said mold for the removal of said object together with its inner incapsulating layer, stripping the latter from said object and repositioning said object in the mold so as to define an incapsulating space in the cavity corresponding to said stripped layer, and thereafter pressure filling said space with an incapsulant simultaneous with the application of fluid pressure to said hollow backing with the latter pressure being slightly in excess of the former pressure so that only the pressure differential is applied to said mold layer defining the cavity thereof during the incapsulating operation.

9. A method of incapsulating an object in a plastic coating, comprising the steps of forming a plurality of incapsulating layers on the object with the inner layer being dimensioned corresponding to the resultant plastic coating desired and with the outer layer having an opening extending to said inner layer, there being a parting agent disposed over the object and between the layers, forming an openable mold from said object with the outer incapsulating layer forming a structural part of the mold and defining the cavity thereof, opening said mold and stripping the inner incapsulating layer from said object, closing said mold with said object positioned in the cavity thereof so as to define a space between said object and cavity corresponding to said stripped layer, and thereafter filling said space through said opening with an incapsulant so as to incapsulate said object therein.

10. The method according to claim 1, said superposed incapsulating layers comprising dielectric material.

References Cited by the Examiner
UNITED STATES PATENTS

| | | | |
|---|---|---|---|
| 1,834,763 | 12/31 | Bonsieur | 18—47 XR |
| 1,868,788 | 7/32 | Zinser. | |
| 2,337,036 | 12/43 | Erdle | 18—47 |
| 2,392,804 | 1/46 | Bosolo | 18—47 XR |
| 2,507,868 | 11/55 | Bond. | |
| 2,724,868 | 11/55 | Kish | 18—59 |
| 2,888,316 | 5/59 | Anderson | 18—47 |
| 2,747,230 | 5/56 | Magnus | 18—59 |
| 3,074,112 | 1/63 | Bobrow | 264—275 |

ROBERT F. WHITE, *Primary Examiner.*

WILLIAM J. STEPHENSON, ALEXANDER H. BRODMERKEL, *Examiners.*